March 16, 1926. 1,576,719
M. J. CHAPLIN
MILLING MACHINE ATTACHMENT FOR LATHES
Filed May 1, 1922 7 Sheets-Sheet 1
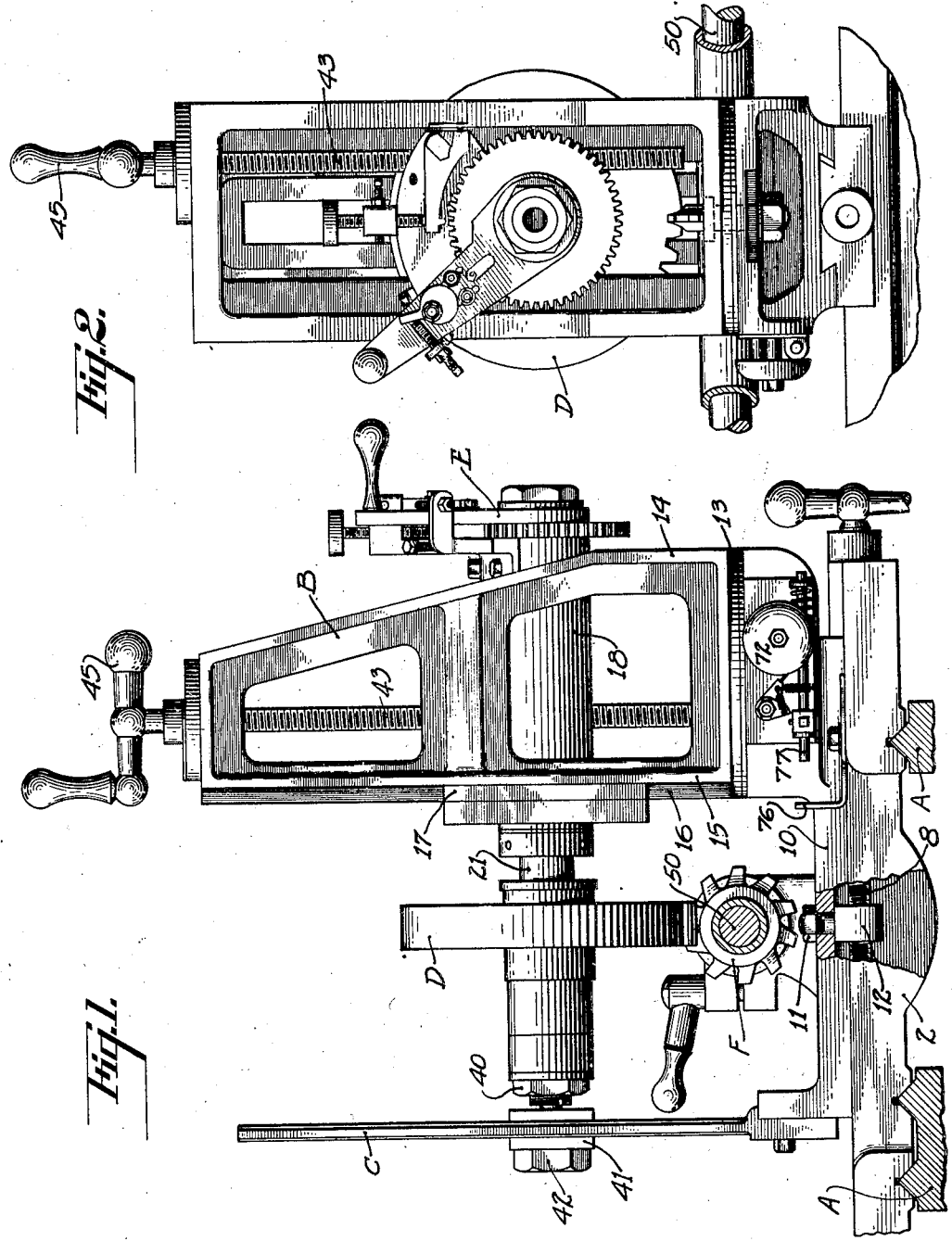
Inventor
MANLEY J. CHAPLIN.
By Dwey, Strong, Townsend & Loftus
Attorneys March 16, 1926.                                                      1,576,719
                         M. J. CHAPLIN
            MILLING MACHINE ATTACHMENT FOR LATHES
                    Filed May 1, 1922          7 Sheets-Sheet 2

Inventor
MANLEY J. CHAPLIN.

By Dewey Strong Townsend & Loftus
Attorneys

March 16, 1926. 1,576,719
M. J. CHAPLIN
MILLING MACHINE ATTACHMENT FOR LATHES
Filed May 1, 1922  7 Sheets-Sheet 3
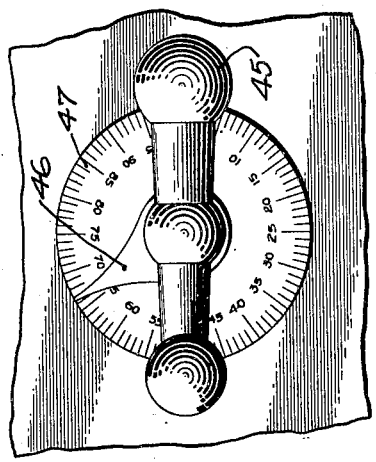
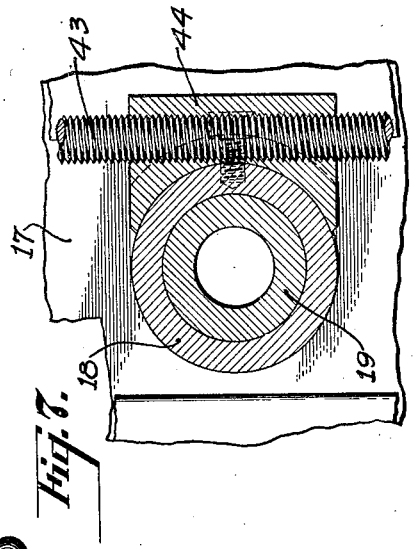
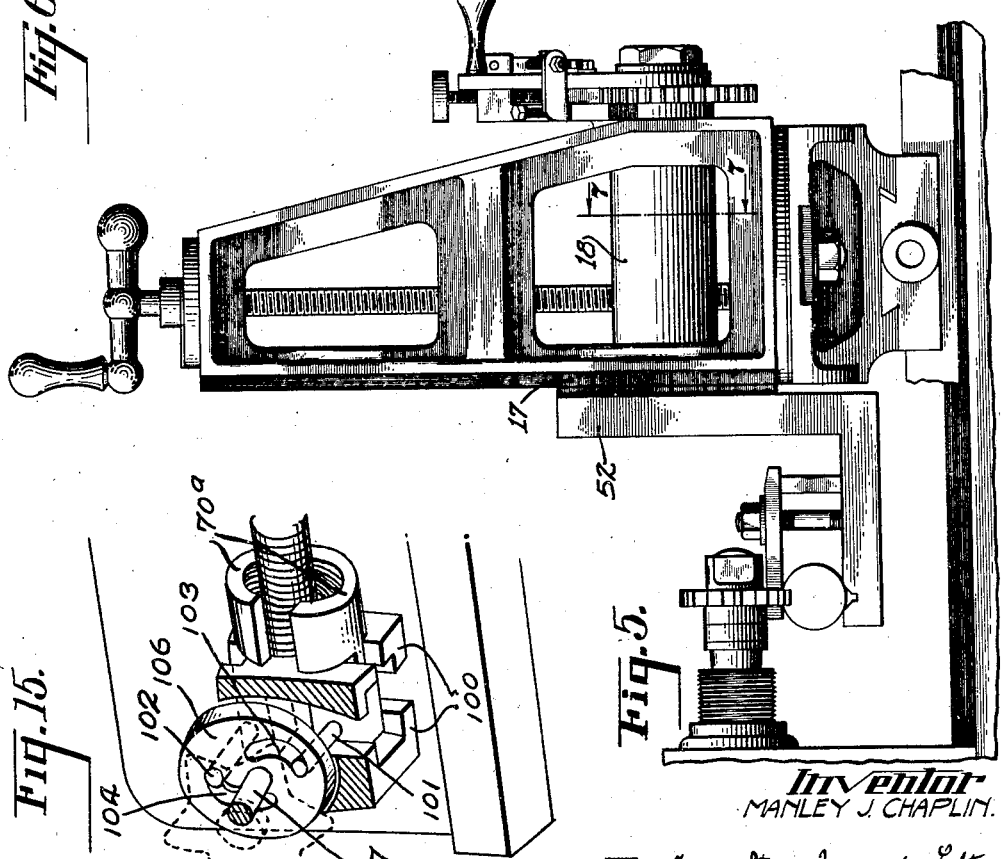
Inventor
MANLEY J. CHAPLIN.
Attorneys

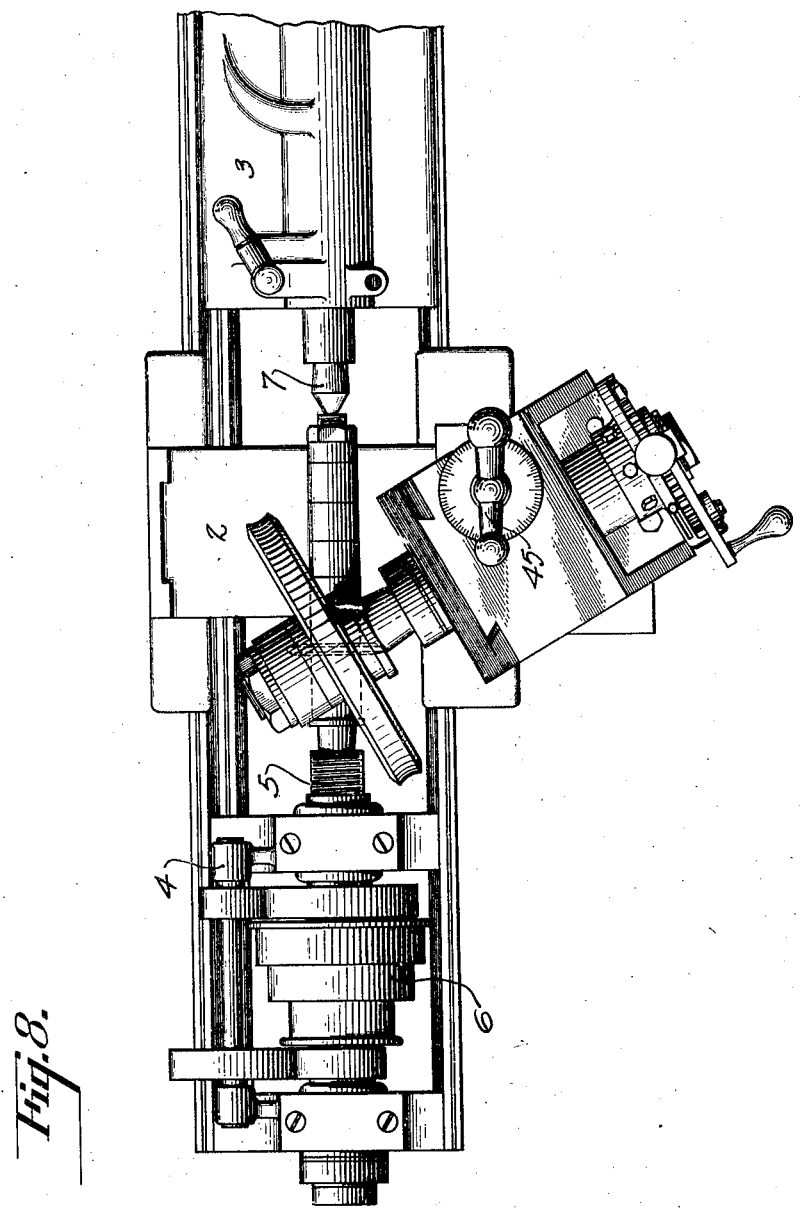

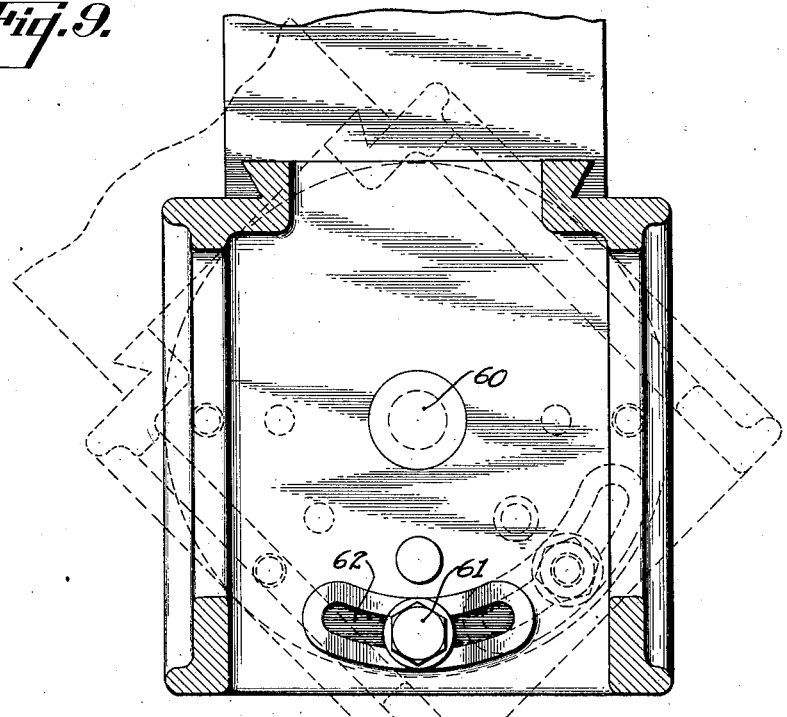
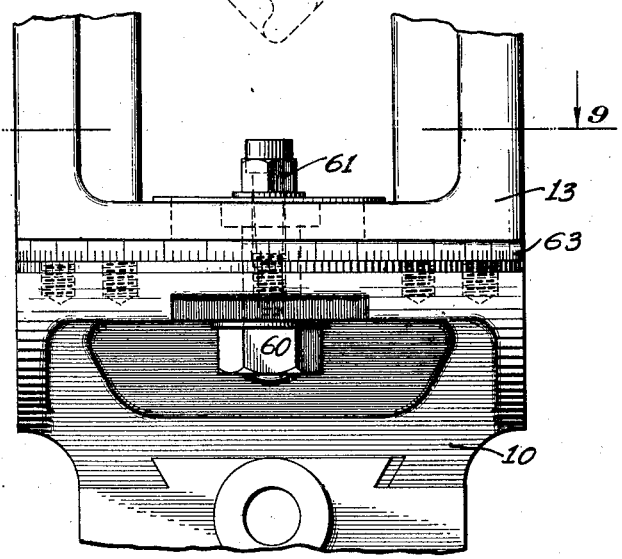

March 16, 1926.　　　　　　　　　　　　　　　　　　1,576,719
M. J. CHAPLIN
MILLING MACHINE ATTACHMENT FOR LATHES
Filed May 1, 1922　　　　　7 Sheets-Sheet 7

Inventor
MANLEY J. CHAPLIN.
By Dewey, Strong, Townsend & Loftus
Attorneys

Patented Mar. 16, 1926.

1,576,719

UNITED STATES PATENT OFFICE.

MANLEY J. CHAPLIN, OF SAN FRANCISCO, CALIFORNIA, ASSIGNOR OF ONE-HALF TO ALFRED J. BAYLEY, OF BERKELEY, CALIFORNIA.

MILLING-MACHINE ATTACHMENT FOR LATHES.

Application filed May 1, 1922. Serial No. 557,623.

*To all whom it may concern:*

Be it known that I, MANLEY J. CHAPLIN, a citizen of the United States, residing at the city and county of San Francisco, State of California, have invented new and useful Improvements in Milling-Machine Attachments for Lathes, of which the following is a specification.

This invention relates to machine tools and particularly to a milling attachment for lathes.

The object of the present invention is to generally improve and simplify tools of the character described; to provide a structure which permits the tool to be quickly attached or removed with relation to the carriage of a lathe; a tool adapted to be actuated and driven by the lathe; to provide a tool whereby a lathe may be adapted for gear cutting and other milling operations; a tool provided with micrometer adjustments, permitting work of an exacting nature to be handled, and further to provide means whereby the work may be rigidly supported and secured during the milling operation.

The invention more specifically stated contemplates an attachment for lathes which may be mounted on the lathe carriage and connected to the transverse feed screw in lieu of the usual compound rest. The attachment is also adapted to properly support and secure gear blanks and is provided with an indexing device and feed mechanism whereby the spacing and depth of the teeth cut in the blank may be accurately determined and adjusted.

The invention further provides means for supporting and propelling a milling cutter, and for vertically and angularly positioning the work with relation to the milling cutter, thus permitting worm gear blanks and the like to be rough cut or gashed and succeeded by a finishing operation. The tool also permits the attachment of a milling table for the reception and support of work other than gear blanks.

One form which the invention may assume is exemplified in the following description and illustrated by way of example in the accompanying drawings, in which—

Fig. 1 is a view in transverse section through a lathe bed, disclosing the milling attachment in side elevation; the attachment being in this instance mounted on the lathe carriage and supporting a gear blank which is being fed over a milling cutter mounted and driven by the lathe mandrel.

Fig. 2 is an end elevation of Fig. 1.

Fig. 5 is a side elevation of the milling attachment mounted on the lathe carriage and supporting a milling table upon which is secured a shaft.

Fig. 6 is a detail plan view of the micrometer dial employed to determine the amount of movement imparted to the spindle head during vertical adjustment thereof.

Fig. 7 is a detail cross section of the index head showing the position of the vertical feed screw with relation thereto.

Fig. 8 is a plan view of a lathe illustrating the position of the milling attachment when cutting a worm gear.

Fig. 9 is a cross section on line 9—9, Fig. 10.

Fig. 10 is an end view of the base plate of the milling attachment and also showing the lower portion of the standards supported thereby.

Fig. 15 is a detail view of the cross feed clutch mechanism.

Figure 3:
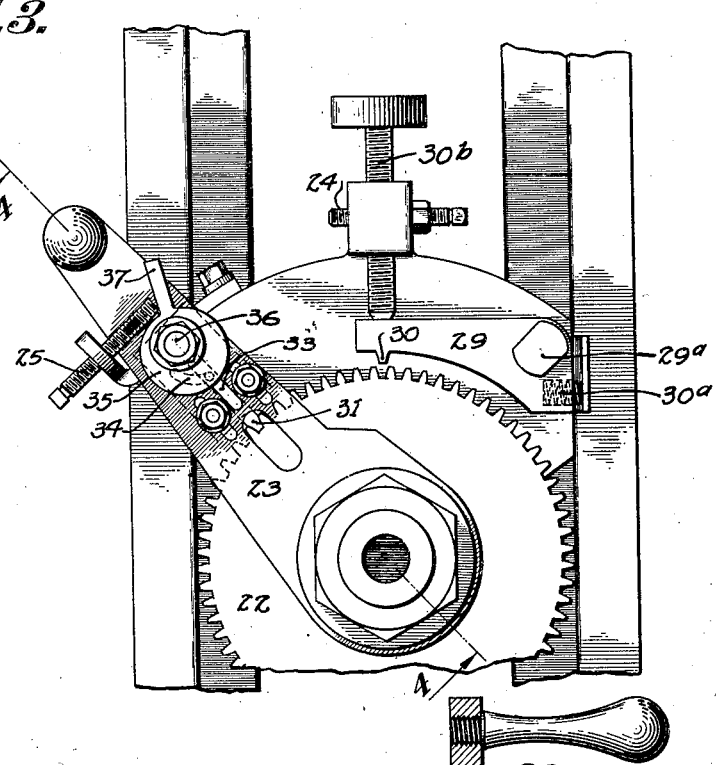
Figs. 3 and 4 are detail views disclosing the indexing head.

Referring to the drawings in detail, and particularly to Figs. 1, 2 and 8, A indicates the ways of a standard form of lathe, 2 the lathe carriage, 3 the tail stock, 4 the head stock, 5 the lathe spindle driven by the multi-step cone pulley 6, 7 the center, 8 the cross feed screw, and 9 the front apron of the carriage whereby the hand and automatic feeding devices are carried.

The milling attachment forming the subject matter of the present invention is adapted to be supported directly upon the lathe carriage 2. The attachment is provided with a base member 10, which takes the place of the usual compound rest and which is secured to the carriage by a screw 11, which forms a part of the cross feed lug 12 of the carriage. The base 10 of the milling attachment supports a vertical frame or standard B, and it further serves as a support for an outrigger C, between which and the standard the gear blank D is secured, as will hereinafter be described.

The standard B consists of a base section 13, a pair of side frames 14 and a front frame 15, on the face of which is formed a dovetailed guide 16. Carried by the guide is a sliding block 17, and forming a part of said block is a bearing member 18 in which is journalled a spindle 19, see Figs. 1, 5 and 7. The forward end of the spindle, or that portion which projects through the sliding block 17, is provided with a tapered socket 20 which is adapted to receive the shank or tapered end of a mandrel 21; this mandrel being provided as a support for the gear blank D, or other work handled by the milling attachment.

The milling attachment is particularly adapted for cutting spur gears and the like, and is for this reason provided with an indexing head, generally indicated at E, whereby the spacing of the teeth and the depth of the same may be accurately determined and adjusted. The indexing head consists of an indexing gear 22, see Figs. 3 and 4, a feed lever 23, and an adjustable stop mechanism, consisting of a pair of screws as indicated at 24 and 25. The indexing gear, together with the feed lever 23, is removable with relation to the spindle, to permit indexing gears having an increased or decreased number of teeth, etc., to be placed thereon. The indexing gear is for this reason secured to a flange 26 formed on the spindle by means of screws 27, and the feed lever is secured by means of a nut carried by a threaded extension 28. The range of movement as far as the feed lever is concerned is determined by the position of the stop screws 24 and 25, and the distance between the same depends upon the size of the teeth being cut in the blank D and the spacing formed between the same. In the present instance the indexing gear is provided with eighty teeth and we will suppose that the gear blank D when completed is to contain twenty teeth. If this is the case it is obvious that the feeding lever 23 will be moved a distance of four teeth as four divided into eighty will give twenty. To insure a spacing of four teeth, it is only necessary to adjust the screws 24 and 25 so that the lever 23 will move just the specified distance. This is accomplished as follows:

A pointer or indicating arm is employed as indicated at 29. This has a pointing tooth 30. The feed lever carries a tooth or pawl as indicated at 31 and this pawl is movable into and out of engagement with the teeth of the indexing gear so that movement will be imparted to the indexing gear in one direction only. Means are therefore provided whereby the pawl 31 is automatically disengaged when the feed lever is turned in one direction, and similarly engaged when the feed lever is turned in the opposite direction. The pawl proper is slidably mounted on the rear side of the lever 23 as shown in Fig. 4, and it is provided with a pin 32, which projects through a slot 33 in the feed lever, and then enters a slot 34 formed in a cam or eccentric member 35. This cam or eccentric is pivotally attached to the lever as at 36 and it is provided with a lever extension 37 so positioned as to engage the stop screws 24 and 25 during movement of the lever 23. Engagement of the arm 37 with the screw 25 turns the eccentric to a position where the pawl 31 is projected into engagement with the teeth of the indexing gear. Movement will therefore be imparted to the indexing gear and the spindle 19 when the lever is turned in the direction of the arrow, see Fig. 3, but disengagement will take place the moment the stop screw 24 is encountered as reverse movement will be imparted to the eccentric and the pawl will then be extracted or disengaged. The lever is thus freely returned to its normal position, shown in Fig. 3, where engagement is again made with the teeth of the indexing gear when the handle 37 encounters the screw 25. The lever 23 is therefore free to move in one direction without imparting movement to the indexing gear and the spindle 19, and it will conversely form a positive drive therefor when swung in the opposite direction. This is important as it materially lessens the responsibility of the operator and entirely eliminates any mistakes once a proper setting and adjustment has been made, and accurate work can in this manner be accomplished without skilled labor or particular attention or care on the part of the operator as the only work requiring careful adjustment is that of first setting the indexing head.

If a gear blank is to be cut as shown at D in Fig. 1, an arbor such as indicated at 21 is employed. This arbor is passed through the hub of the blank and its forward or tapered end enters the socket 20 of the spindle 19. A driving connection is in this manner formed and simultaneously a rigid support is provided. A series of spacing washers are then placed over the mandrel and a nut applied as indicated at 40. To further secure the blank and the arbor the outer end of the arbor is passed through a block 41, which is vertically adjustable in the outrigger C and it is here rigidly secured and clamped by means of a nut 42. The arbor 21 is in this manner rigidly supported at both ends and chattering or rough cutting of the blank is thus prevented.

As previously stated it is possible to adjust the indexing head to cut any number of teeth desired in the blank D. Once this adjustment has been made it is obvious that it is also necessary to determine the depth of the cut. This is accomplished by adjusting the feed screw, generally indicated at 43, see Figs. 1, 2 and 7. The feed screw is journalled between the side sections 14 of the standard B and it passes through a nut 44 secured on one side of the bearing member 18. The upper end of the screw is provided with a handle 45, see Fig. 6, an index finger 46 and a micrometer dial 47. By turning the handle vertical movement will be imparted to the bearing 18 and the slide block 17, and as these members support the mandrel 21, it is obvious that vertical adjustment and positioning of the blank D with relation to the milling cutter indicated at F may be readily accomplished. The milling tool employed would in the case of a spur gear be a standard form of cutter, as indicated at F, and will in any instance be supported by a mandrel 50, which is driven by the spindle 5 of the lathe, that is one end of the mandrel would be tapered to permit it to be inserted in the spindle, while the opposite end would be provided with a center to permit it to be centered and supported by the center 7 and the tail stock 3. The milling cutter would be secured in the arbor in any suitable manner and as such would be driven by the spindle 5 and the pulley 6. One form of arbor for the support of the milling cutter F is disclosed in Fig. 8, and another type of arbor is disclosed in Fig. 5. The type shown in Fig. 8 is employed when cutting gears, whether of the spur or worm type, while a shorter arbor illustrated in Fig. 5 is employed when the work to be milled is secured and disposed on a face or angle plate such as indicated at 52, see Fig. 5. This plate may be secured to the sliding block 17 in any suitable manner and when so secured may be raised or lowered with relation to the milling cutter, thus permitting the work to be adjusted, raised, lowered etc., with relation to the milling cutter. The carriage proper supporting the milling attachment may be actuated by the cross feed of the lathe or by the longitudinal feed and the work may therefore be moved in either direction with relation to the milling cutter.

When cutting worm gears as shown in Fig. 8, it is necessary to support the gear blank so that it will assume an angle with relation to the milling cutter. To permit such adjustment a pivotal connection is formed between the base 10 and the base 13 of the standard B. This pivotal connection is best illustrated in Figs. 9 and 10. It consists of a centrally disposed bolt 60, about which the standard may be turned to assume an angle desired, and means are provided for securing the standard when so adjusted. This means consists of a clamping bolt 61, which passes through a segmental shaped slot 62 and the base proper. This screw when tightened secures the standard against turning movement. The base of the standard is graduated as indicated at 63 and as such may be set to assume any angle desired.

From the foregoing description it can be seen that turning movement of the standard with relation to the base supporting the same is permitted and that means are provided for securing the standard when so turned; further vertical movement of the indexing head, the bearing 18 and the slide block 17 is permitted and the work supported by the sliding block, whether the angle plate 52 is attached thereto or not, will also be permitted. Any adjusting or positioning of the device with relation to the milling cutter may in this manner be obtained.

Figure 11:
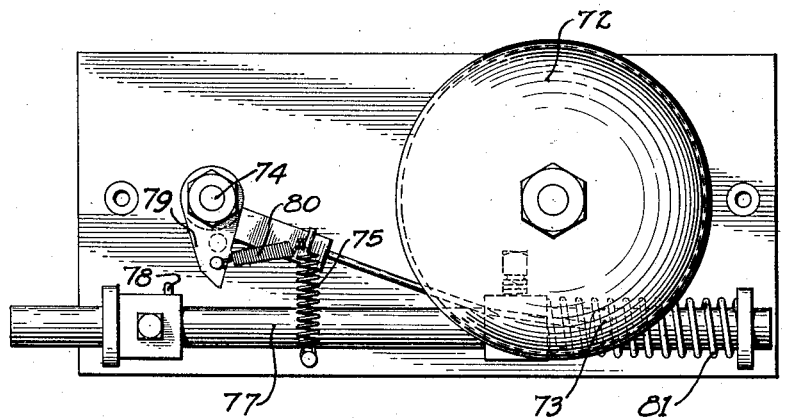
Figs. 11 and 12 are views disclosing a form of alarm signal employed to warn the operator when a cut has been completed.
Figure 12:
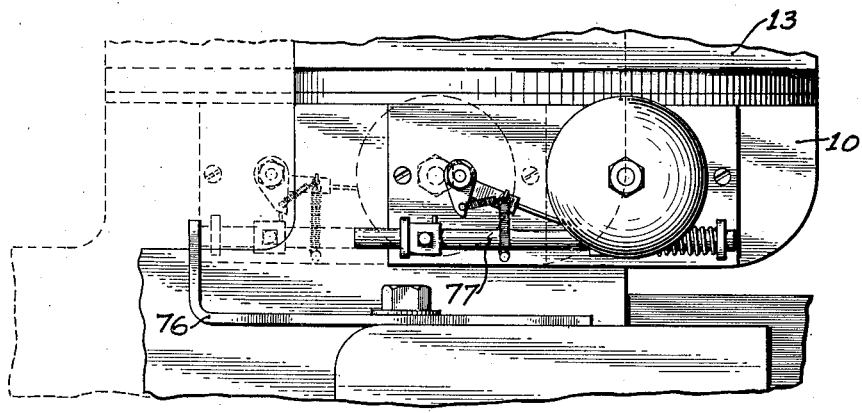

In actual operation we will suppose that the spur gear is being cut as indicated in Fig. 1, and that the proper adjustments for depth and number of teeth have been made. If this is the case the cross feed of the carriage will be connected by engaging the cross feed clutch 70$^a$, this being accomplished by turning the star wheel 70 in the proper direction. The cross feed clutch consists of two members which are slidably mounted between guide ways such as indicated at 100. Each clutch member is provided with a projecting pin such as indicated at 101 and 102. These pins project through cam slots 103 and 104 formed in a disc 106, this disc being secured to a shaft 107; and the star wheel 70 together with the gear 95 (see Fig. 14) is also secured on the shaft 107. When star wheel 70 is rotated in one direction, disc 106 rotates in unison therewith. The inner faces of cam slots 103 and 104 thus engage the pins and hold the clutch members 70$^a$ together, thus starting the cross feed. The power feed of the lathe will then advance the carriage and the milling attachment supported thereby crosswise of the lathe and the blank will thus be advanced with relation to the milling cutter F, and one tooth will be cut. When the star wheel is turned in the opposite direction the clutch members are separated and the feed is discontinued. For the purpose of warning the operator when the cut has been completed, an alarm mechanism such as illustrated in Figs. 1, 11 and 12 has been provided. This alarm mechanism consists of a bell or gong 72 secured to the side of the base 10. A hammer 73 disposed interior of the bell is pivotally secured to a bolt or pin 74 at its upper end. A spring attached to the arm as at 75 normally holds the hammer in engagement with the bell, but means are provided for slowly raising the hammer and for suddenly releasing the same when the cut has been completed. This is accomplished by providing an adjustable stop 76 and a slide rod 77, which is adapted to engage the stop. During forward movement of the carriage and the milling attachment as a whole, the forward end of the rod 77 will engage the stop 76 as indicated in Fig. 12 and a rocking movement will be imparted to the arm 73 of the hammer to lift this in an upward direction. This movement is transmitted through a pin 78 formed on the collar secured on the rod which engages a pawl or arm 79 turnably mounted on the pin 74. A pin on the inner side of the pawl 79 engages the arm 73 and gradually raises the hammer arm. When a predetermined movement has been imparted to the rod 77, pin 78 will pass the pawl 79 and the pawl and the arm will thus be released and the bell will be struck by the hammer due to the rapid return or recoil of the spring 75. The operator is in this manner warned that the cut is completed and will then disconnect the cross feed by reversing the movement of the star wheel 70. The carriage will then be retracted, the feed lever will be advanced to turn the blank the distance of one tooth, and the cross feed will again be connected to permit the cutting of a second tooth; this operation being repeated and repeated until all of the teeth have been cut. A second spring as indicated at 80 is employed, see Fig. 11, to permit retrograde movement of the rod 77 during retraction of the lathe carriage, and also to permit return movement of the plunger rod 77, that is the plunger rod is normally held in a projected position by a spring 81, and this spring is compressed during the tripping operation of the bell. It is however automatically projected when the carriage is retracted and is thus in proper position for operation when the gong is again sounded.

Figure 13:
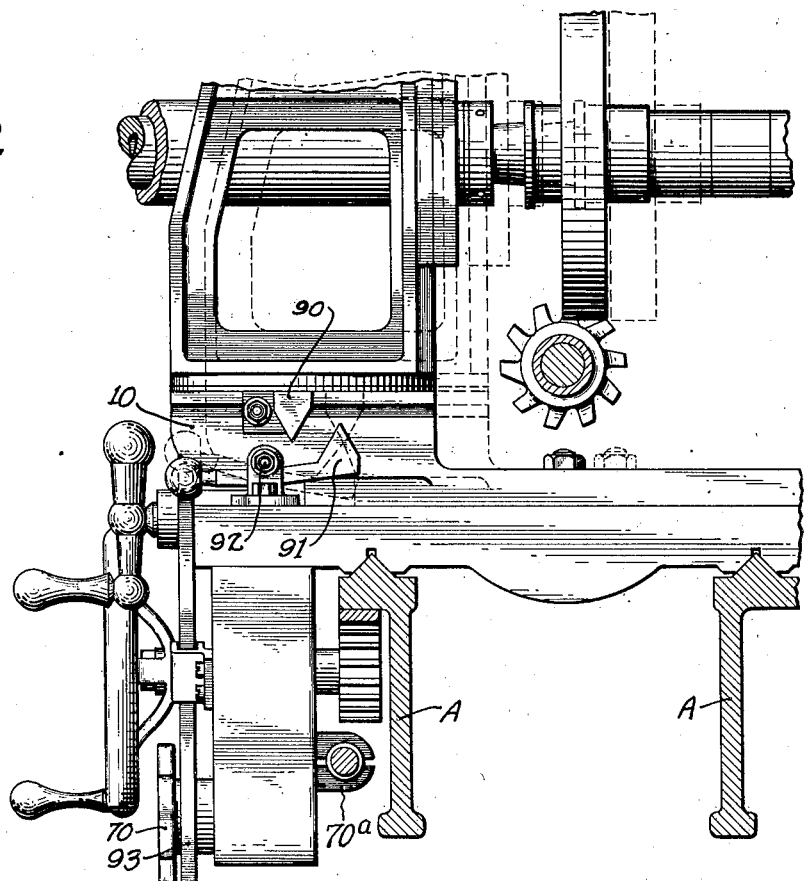
Figs. 13 and 14 are side and end elevations, respectively, disclosing the automatic cut off employed in connection with the cross feed.
Figure 14:
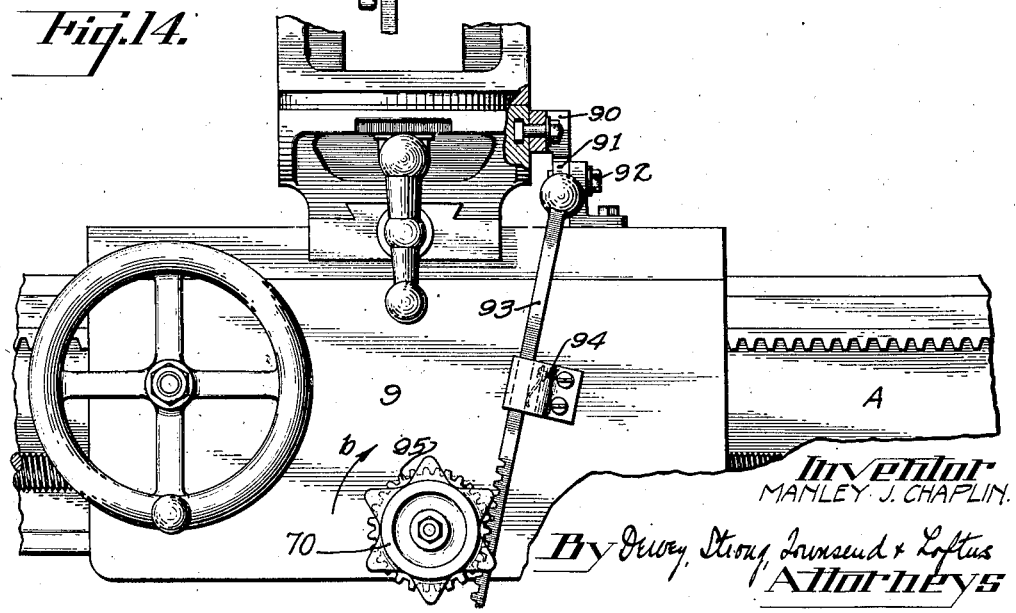

Another modification is illustrated in Figs. 13 and 14. In that instance means are provided for automatically disconnecting the cross feed when the cut has been completed. This is accomplished by the use of a cam 90 and a lever 91; the cam 90 being secured on the side of the base 10, while the lever 91 is pivotally attached to the carriage as at 92. The outer end of the lever carries a rack bar 93, which is guided, as at 94, and which meshes with a gear 95 secured on the shaft by which the star wheel 70 is supported. The operator, when the milling attachment has been set for operation, turns the star wheel in the direction of arrow b, such turning movement engages the cross feed clutch and starts the operation. The carriage will continue feeding until the cut has been completed when the cam 90 will engage the lever 91 and rock the same. This rocking movement is imparted to the rack bar 93 and the star wheel is thus turned in the opposite direction and will thereby automatically disengage the cross feed clutch.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or various uses may demand.

Figure 4:
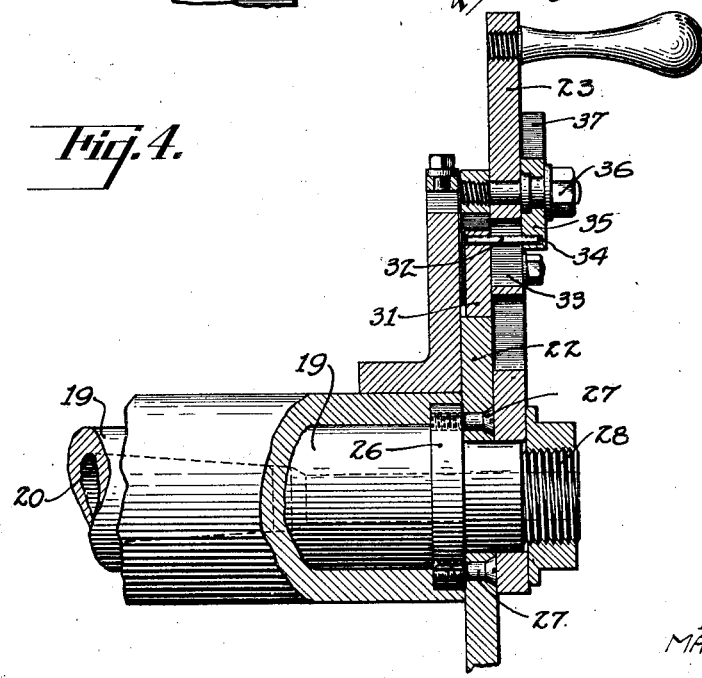

In connection with the indexing head E, by referring to Figs. 2 and 3, it will be seen that the lever 29 is pivotally mounted on the indexing head as at 29ª, and it is normally held in a raised position by means of a spring 30ª. When so raised it is engaged by a screw 30ᵇ, which serves an important function, to-wit, that of positively locking the spindle and the gear blank D during the cutting operation, that is after a cut has been completed and the feeding lever 23 has been advanced to turn the blank for a new cut, it is essential that the blank be secured against turning movement during the next cutting operation. This is accomplished by turning the screw 30ᵇ in a direction which will force the lever 29 down and thereby bring the indexing tooth 30 into engagement with the teeth of the indexing gear 22. This engagement locks the indexing gear against turning movement and as this gear is secured to the spindle through means of the screws 27 and the collar 26, it can readily be seen that the gear blank will be positively secured against turning movement during the cutting operation.

Having thus described my invention, what I claim and desire to secure by Letters Patent is—

1. In combination with a lathe, of a spindle head, a supporting standard adapted to be mounted on the carriage of the lathe, a connection between said standard and the transverse feed screw in the carriage whereby turning movement of the feed screw will impart transverse movement to the standard, and means associated with the standard and the carriage adapted to audibly announce the fact that the standard has reached the end of its travel in one direction.

2. In combination with a lathe, of a spindle head, a supporting standard adapted to be mounted on the carriage of the lathe, a connection between said standard and the transverse feed screw in the carriage whereby turning movement of the feed screw will impart transverse movement to the standard, and means associated with the standard and the apron of the lathe for automatically discontinuing the rotation of the transverse feed screw when the standard has reached the end of its travel in one direction.

3. In combination with a lathe, of a milling table adapted to be supported on the carriage of the lathe, means operatively for connecting said milling table to the transverse feed screw in said carriage where reciprocating movement may be imparted to the said milling table, and means for audibly announcing that the table has reached the end of its travel in one direction.

4. In combination with a lathe of a milling table, the same comprising a base plate having a slot formed therein adapted to receive the feed lug of the lathe carriage whereby the base plate may be guided for movement transversely to the lathe bed, means for operatively connecting the base plate to the transverse feed screw in the lathe carriage, a spindle head supporting standard turnably mounted on said base plate, means whereby the said standard may be set at any desired angle to the said base, a spindle head mounted and guided for vertical movement in said standard, a feed screw engaging said spindle head, a calibrated dial, a pointer on said feed screw associated with said dial, whereby turning movement of the feed screw will visibly indicate on the dial the amount of vertical movement imparted to the spindle head.

5. In combination with a lathe, of a milling table, the same comprising a base plate having a slot formed therein adapted to receive the feed lug of the lathe carriage whereby the base plate may be guided for movement transversely to the lathe bed, means for operatively connecting the base plate to the transverse feed screw in the lathe carriage, a spindle head supporting standard turnably mounted on said base plate, means whereby the said standard may be set at any desired angle to the said base, a spindle head mounted and guided for vertical movement in said standard, a feed screw engaging said spindle head, a calibrated dial, a pointer on said feed screw associated with said dial whereby turning movement of the feed screw will visibly indicate on the dial the amount of vertical movement imparted to the spindle head, a spindle mounted for turning movement in said spindle head, means for imparting a predetermined amount of turning movement to said spindle, and means for locking said spindle in a set position.

6. In a milling attachment of the character described the combination with the slide block and the spindle head carried thereby, of a spindle turnably mounted in the head, an indexing gear secured on one end of the spindle, a feed lever turnably mounted on the spindle with relation to the indexing gear, a pawl carried by the lever and engageable with the teeth of the indexing gear, an eccentric carried by the lever and connected with the pawl, a lever extension on said eccentric, and a pair of adjustable stop screws with which said lever is engageable, said lever imparting a turning movement to the eccentric when engaging one stop screw to retract the pawl with relation to the teeth of the indexing gear, and conversely imparts a turning movement to the eccentric which will project the pawl into engagement with the teeth when engagement is made with the opposite stop screw.

7. In a milling attachment of the character described the combination with the slide block and the spindle head carried thereby, of a spindle turnably mounted in the head, an indexing gear secured on one end of the spindle, a feed lever turnably mounted on the spindle with relation to the indexing gear, a pawl carried by the lever and engageable with the teeth of the indexing gear, an eccentric carried by the lever and connected with the pawl, a lever extension on said eccentric, a pair of adjustable stop screws with which said lever is engageable, said lever imparting a turning movement to the eccentric when engaging one stop screw to retract the pawl with relation to the teeth of the indexing gear, and conversely imparts a turning movement to the eccentric which will project the pawl into engagement with the teeth when engagement is made with the opposite stop screw, a second pivotally mounted lever, a tooth formed thereon, means for normally maintaining said lever in a raised position with relation to the indexing gear, and manually actuated means for depressing the lever to bring the tooth formed thereon into engagement with the teeth of the indexing gear.

MANLEY J. CHAPLIN.